(12) United States Patent
Zdroik et al.

(10) Patent No.: US 7,143,748 B2
(45) Date of Patent: Dec. 5, 2006

(54) FUEL RAIL CROSSOVER HOSE

(75) Inventors: Michael J. Zdroik, Metamora, MI (US); Robert Doherty, Syracuse, IN (US); Jackson Zel Roe, Goshen, IN (US); Gary Lynn Handshoe, Wawaka, IN (US)

(73) Assignee: Millennium Industries, Corp., Auburn Hills, MI (US)

( * ) Notice: Subject to any disclaimer, the term of this patent is extended or adjusted under 35 U.S.C. 154(b) by 0 days.

(21) Appl. No.: 11/336,153

(22) Filed: Jan. 20, 2006

(65) Prior Publication Data

US 2006/0137656 A1    Jun. 29, 2006

Related U.S. Application Data

(62) Division of application No. 10/721,943, filed on Nov. 25, 2003, now Pat. No. 7,021,290.

(51) Int. Cl.
*F02M 37/04* (2006.01)

(52) U.S. Cl. .................... 123/467; 123/469; 138/30

(58) Field of Classification Search ............... 123/467, 123/456, 468, 469, 470, 447; 138/28, 30
See application file for complete search history.

(56) References Cited

U.S. PATENT DOCUMENTS

| | | | |
|---|---|---|---|
| 3,810,581 A * | 5/1974 | Rhine et al. ............. 239/533.3 |
| 4,586,477 A | 5/1986 | Field et al. |
| 4,697,674 A * | 10/1987 | Tangorra .................... 188/298 |
| 4,794,955 A * | 1/1989 | Ejima et al. .................. 138/30 |
| 4,798,187 A | 1/1989 | Hudson, Jr. |
| 5,056,489 A | 10/1991 | Lorraine |
| 5,080,069 A | 1/1992 | Hudson, Jr. |
| 5,168,856 A | 12/1992 | Lorraine |
| 5,511,527 A | 4/1996 | Lorraine et al. |
| 5,516,266 A | 5/1996 | Talaski |
| 5,577,479 A | 11/1996 | Popp |
| 5,752,486 A | 5/1998 | Nakashima et al. |
| 5,845,621 A | 12/1998 | Robinson et al. |
| 5,954,031 A * | 9/1999 | Ogiso et al. ................ 123/447 |
| 6,019,089 A | 2/2000 | Taylor et al. |
| 6,189,510 B1 * | 2/2001 | Jaeger et al. ............... 123/468 |
| 6,223,725 B1 | 5/2001 | Onishi et al. |
| 6,354,273 B1 | 3/2002 | Imura et al. |
| 6,371,083 B1 | 4/2002 | Rossi et al. |
| 6,401,691 B1 | 6/2002 | Kawano et al. |
| 6,415,768 B1 | 7/2002 | Usui |
| 6,431,149 B1 | 8/2002 | Schwegler et al. |
| 6,505,608 B1 | 1/2003 | Hiraku et al. |
| 6,601,564 B1 | 8/2003 | Davey |
| 2001/0029929 A1 | 10/2001 | Natsume |
| 2002/0148446 A1 | 10/2002 | Gmelin |

* cited by examiner

*Primary Examiner*—Carl S. Miller
(74) *Attorney, Agent, or Firm*—Dykema Gossett PLLC

(57) ABSTRACT

A fuel rail assembly with crossover conduits for communicating fuel between two fuel rails of a fuel-injected, spark ignited internal combustion engine is provided. The hose has a body with a mechanism for damping pressure pulsations within the fuel rail assembly.

16 Claims, 3 Drawing Sheets

FUEL RAIL CROSSOVER HOSE

CROSS REFERENCE TO RELATED APPLICATIONS

This application is a divisional application of and claims priority to U.S. patent application Ser. No. 10/721,943 entitled "FUEL RAIL CROSSOVER HOSE", filed Nov. 25, 2003, now U.S. Pat. No. 7,021,290 and hereby incorporated by referenced in its entirety.

FIELD OF THE INVENTION

The field of the present invention is fuel rail assemblies for spark-ignited reciprocating piston internal combustion engines and in particular, fuel rail assemblies having crossover conduits such as tubes or hoses to allow fluid communication between two separate fuel rails for reciprocating piston, spark-ignited internal combustion engines.

BACKGROUND OF THE INVENTION

In the past three decades, there have been major technological efforts to increase the fuel efficiency of automotive vehicles. One technical trend to improve fuel efficiency has been to reduce the overall weight of the vehicle. A second trend to improve fuel efficiency has been to improve the aerodynamic design of a vehicle to lower its aerodynamic drag. Still another trend is to address the overall fuel efficiency of the engine.

Prior to 1970, the majority of production vehicles with a reciprocating piston gasoline engine had a carburetor fuel supply system in which gasoline is delivered via the engine throttle body and is therefore mixed with the incoming air. Accordingly, the amount of fuel delivered to any one cylinder is a function of the incoming air delivered to a given cylinder. Airflow into a cylinder is effected by many variables including the flow dynamics of the intake manifold and the flow dynamics of the exhaust system.

To increase fuel efficiency and to better control exhaust emissions, many vehicle manufacturers went to port fuel injection systems, where the carburetor was replaced by a fuel injector that injected the fuel into a port which typically served a plurality of cylinders. Although port fuel injection is an improvement over the prior carburetor fuel injection system, it is still desirable to further improve the control of fuel delivered to a given cylinder. In a step to further enhance fuel delivery, many spark ignited gasoline engines have gone to a system wherein there is supplied a fuel injector for each individual cylinder. The fuel injectors receive their fuel from a fuel rail, which is typically connected with all or half of the fuel injectors on one bank of an engine. Inline 4, 5 and 6 cylinder engines typically have one bank. V-block type 6, 8, 10 and 12 cylinder engines have two banks.

One critical aspect of a fuel rail application is the delivery of a precise amount of fuel at a precise pressure. In an actual application, the fuel is delivered to the rail from the fuel pump in the vehicle fuel tank. At an engine off condition, the pressure within the fuel rail is typically 45 to 60 psi. When the engine is started, a typical injector firing of 2–50 milligrams per pulse momentarily depletes the fuel locally in the fuel rail. Then the sudden closing of the injector creates a pressure pulse back into the fuel rail. The injectors will typically be open 1.5–20 milliseconds within a period of 10–100 milliseconds.

The opening and closing of the injectors creates pressure pulsations (typically 4–10 psi peak-to-peak) up and down the fuel rail, resulting in an undesirable condition where the pressure locally at a given injector may be higher or lower than the injector is ordinarily calibrated to. If the pressure adjacent to the injector within the fuel rail is outside a given calibrated range, then the fuel delivered upon the next opening of the injector may be higher or lower than that preferred. Pulsations are also undesirable in that they can cause noise generation. Pressure pulsations can be exaggerated in a returnless delivery system where there is a single feed into the fuel rail and the fuel rail has a closed end point.

To reduce undesired pulsations within the fuel rails, many fuel rails are provided with added pressure dampeners. Dampers with elastomeric diaphragms can reduce peak-to-peak pulsations to approximately 1–3 psi. However, added pressure dampeners are sometimes undesirable in that they add extra expense to the fuel rail and also provide additional leak paths in their connection with the fuel rail or leak paths due to the construction of the damper. This is especially true with new Environmental Protection Agency hydrocarbon permeation standards, which are difficult to satisfy with standard O-ring joints and materials. It is desirable to provide a fuel rail wherein pressure pulsations are reduced while minimizing the need for dampers.

SUMMARY OF THE INVENTION

The present invention relates to a crossover conduit such as a tube or hose which connects fuel rails on a spark-ignited internal combustion engine. In one preferred embodiment, the crossover hose has a flattened section to improve flexibility and thereby reduce pressure pulsations in the fuel rail assembly. The present invention provides a fuel rail which provides damping characteristics which minimizes or eliminates any requirement for separate fluid dampeners to be added to the fuel rail.

Further features and advantages of the present invention will become more apparent to those skilled in the art after a review of the invention as it shown in the accompanying drawings and detailed description.

DETAILED DESCRIPTION OF THE INVENTION

Figure 1:
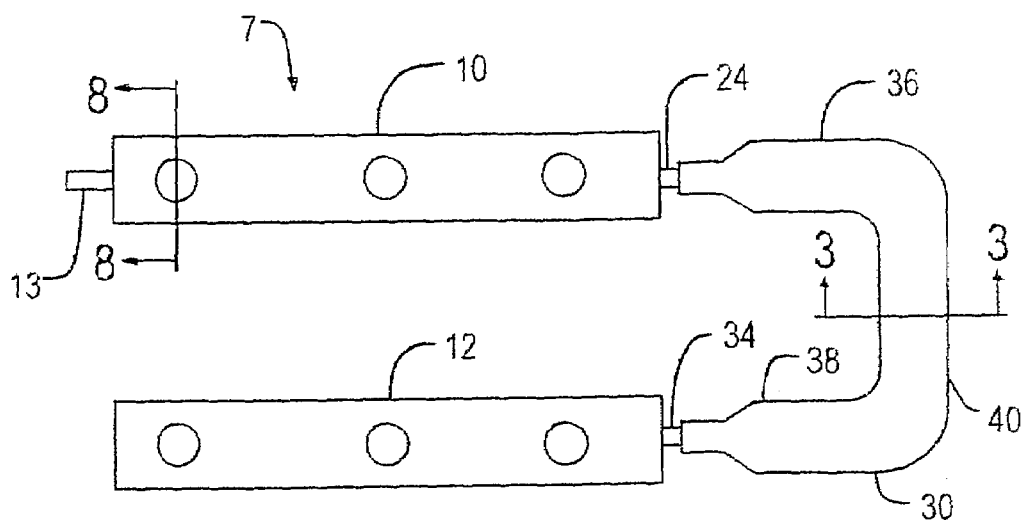
FIG. 1 is a top schematic view of a fuel system which utilizes a crossover hose according to the present invention.
Figure 2:
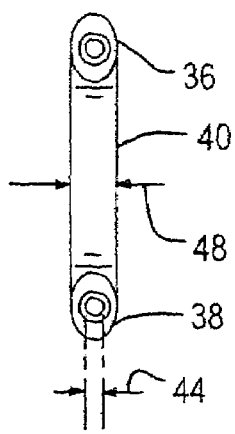
FIG. 2 is a side elevational schematic view of the crossover hose shown in FIG. 1.
Figure 3:
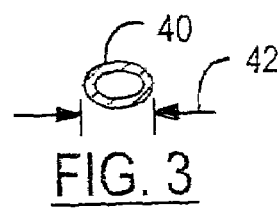
FIG. 3 is a view taken along line 3—3 of FIG. 1.
Figure 4:
FIG. 4 is a view taken along line 4—4 of FIG. 7.
Figure 5:
FIG. 5 is a view taken along line 5—5 of FIG. 7.
Figure 6:
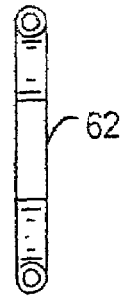
FIG. 6 is a side elevational schematic view of an alternate preferred embodiment fuel crossover hose shown in FIG. 7.
Figure 7:
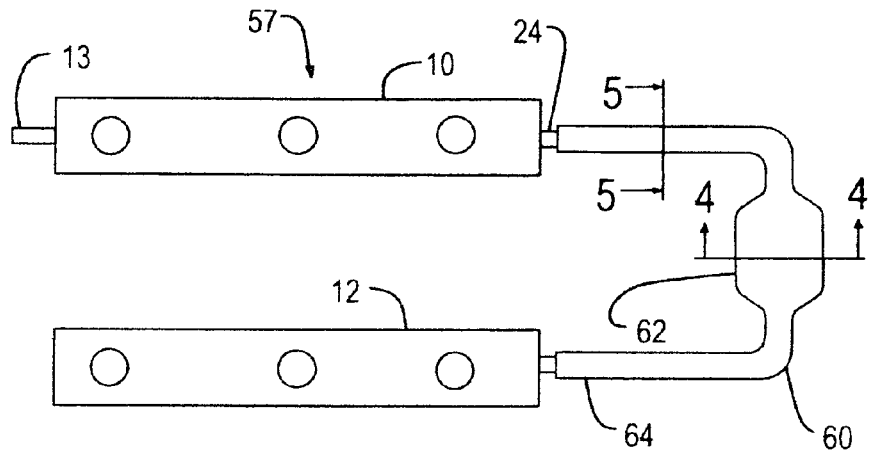
FIG. 7 is a top schematic view of a fuel rail system utilizing an alternate preferred embodiment crossover hose of the present invention.

Referring to FIGS. 1 through 8, a fuel rail assembly 7 is provided according to the present invention. The fuel rail assembly includes a first rail 10 and a second rail 12. Fuel rail 10 is provided with an inlet 13. The inlet 13 allows the fuel rail 10 to receive pressurized fuel from a fuel pump (not shown). The fuel rail 10 has a control volume 14, as provided by a generally rectangular tube 16. In other embodiments (not shown), the fuel rail may be a cylindrical tubular member. The fuel rail is typically made from sheet metal or a high-temperature tolerant polymeric plastic material.

The fuel rail has a series of outlets or orifices 18. Flexibly joined to the fuel rail adjacent to orifices 18 are injector cups 20. The injector cups 20 provide an aligning and mounting surface for fuel injectors (not shown). As shown, fuel rail 10 has three orifices 18 and supplies fuel to a bank on a V6 internal combustion engine (not shown). The fuel rail 10 has an orifice outlet which is provided with a connecting barbed male neck fitting 24. The fuel rail 12 is essentially similar to the fuel rail 10, with the exception that it does not have an inlet which is connected with the fuel pump.

To provide fluid communication for the fuel between the fuel rails 10 and 12, there is a crossover conduit provided by a hose 30. The hose 30 will typically have a structural portion wall thickness between 0.70 and 1.4 mm. The crossover hose 30 structural portion is preferably fabricated from a polymeric plastic material such as nylon/ETFE (copolymer of ethylene and tetrafluoroethylene) or other suitable alternatives. The crossover hose 30 has a 0.15 mm barrier layer formed of a fluoropolymer film such as that offered under the trademark TEFZEL® (copolymer of tetrafluoroethylene and ethylene) and an outside fire jacket which is typically formed of a thermoplastic elastomer material such as that offered under the trademark SANTOPRENE® or other fire resistant material such as the olefin alloy offered under the trademark ETHAVIN™ which can be 1.0–4.0 mm thick depending on burn test requirements. The technical specification of the hose will often be Society of Automotive Engineers' J 2045.

The crossover hose 30 has on its opposite ends female connections 34 to allow the crossover hose 30 to be joined with the fuel rails 10 and 12. The crossover hose, as shown, has a main body with a U shape, having non-flattened legs 36 and 38 which are continuous with the end connections 24 and 34. The legs 36 and 38 have a generally enlarged diameter with respect to the diameter of the end connections 24, 34. The base of the channel shape provided by the crossover hose 30 has a generally flattened portion 40. Legs 36 and 38 juxtapose the flattened portion 40 from the end connections 24, 34. The flattened portion 40 has a width 42 which is generally larger than the diameter 44 of the end connections 34. In many instances it will be a 2:1 ratio over the diameter 44. The flattened portion 40 typically has a height 48 which is greater than the diameter 44 of the end connections 34.

In operation, pressurized fuel will be delivered to fuel rail 10 through inlet 13. Via inlet 13, fuel will be distributed to various injectors on one bank of a V6 engine via the orifices 18. Excessive fuel is deliberately pumped into fuel rail 10 so as to communicate with the fuel rail 12 via the crossover hose 30. Fuel rail 12 will supply fuel to the opposite bank of the V6 engine in a manner similar to fuel rail 10.

The opening and closing of the various fuel injectors will cause pulsations to be generated within the fuel rail assembly 7. Pulsations will be absorbed by the flattened portion 40 of the crossover hose being elastically deformed thereby. Increased pressurization will cause the flattened portion to expand in an attempt to take on a more circular shape. An enlarged volume will be created, thereby decreasing pressure. Under-pressurization will cause the degenerative flattened portion to collapse, thereby reducing the overall volume within the crossover hose and therefore inhibiting the decreasing pressure by reducing the overall volume of the fuel rail assembly 7. The main damping effect is provided by the structural portion of the crossover hose 30.

Referring now to FIGS. 4 through 7, an alternate preferred embodiment fuel rail assembly 57 is provided having fuel rails 10 and 12 identical as those previously described. The crossover hose 60 has two female end connections 64 which are fitted over the neck orifices 24 of the fuel hose. The crossover hose 60 has a flattened portion 62 which has a width which is significantly enlarged from that of the remainder of the crossover hose. Pressure pulsations are minimized by the expansion and contraction of the flattened portion in a manner as similarly described for the crossover hose 30.

It will be apparent to those skilled in art that male end connections can be substituted for the female end connection 64, if so desired. Typically, the height of the flattened portion 62 of the crossover hose 60 will be less than the height of a crossover hose taken along sectional line 5—5.

Figure 9:
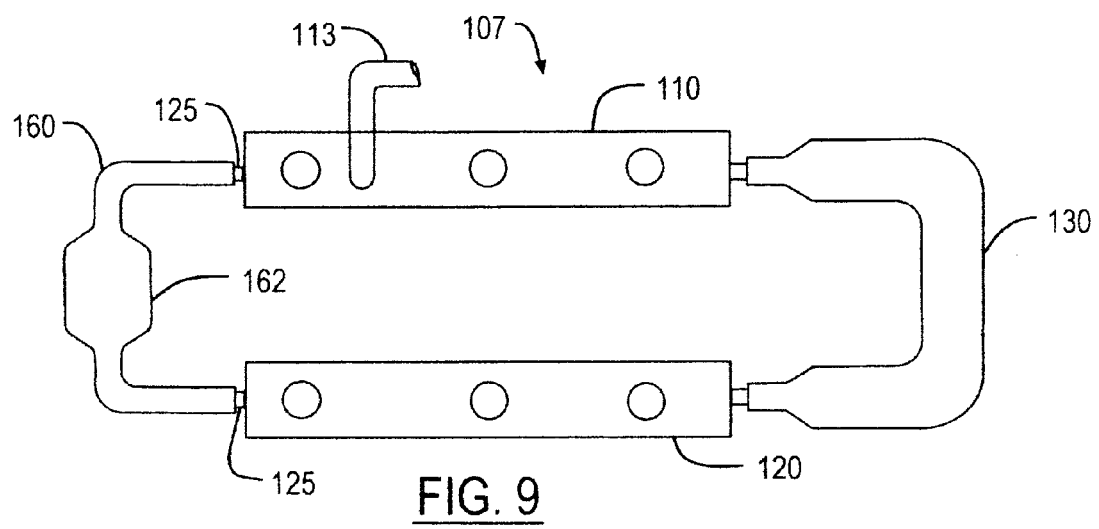
FIG. 9 is a top schematic view of a fuel delivery system which utilizes two separate crossover hoses.
Figure 8:
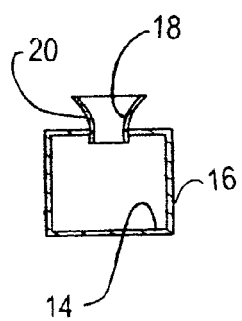
FIG. 8 is a view taken along line 8—8 of FIG. 1.

Referring to FIG. 9, a fuel rail delivery system 107 is provided having a first fuel rail 110 and a second fuel rail 120. The fuel rail system 107 has a fuel inlet 113 which delivers fuel through the top of the fuel rail 110. The fuel rails 110 and 120 also have a second set of orifice outlets 125. Connected with the second set of orifice outlets 125 is a second crossover hose 160. The second crossover hose 160 can have a flattened portion 162 as shown or it can simply be regular constant diameter hose tubing. As readily apparent, crossover hose 160 and the opposite crossover hose 130 are non-symmetric with respect to one another. This helps to break up any resonant frequencies which may occur during operation of the engine that the fuel delivery system 107 is associated therewith.

Figure 10:
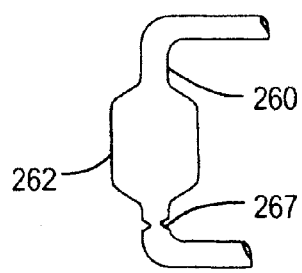
FIG. 10 is a top schematic view illustrating a crossover hose similar or near identical to that shown in FIGS. 7 and 9, and which additionally incorporates a fluid flow restrictor.
Figure 11:
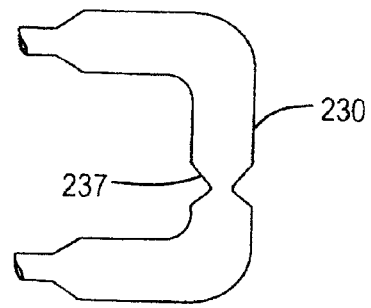
FIG. 11 is a top schematic view of a crossover hose similar or near identical to that shown in FIGS. 1 and 9, and which additionally incorporates a fluid flow restrictor.

Referring to FIGS. 10–11, a crossover hose 260 with a flattened portion 262 is provided which is substantially similar to crossover hoses 160 and 60 as previously described. Additionally, crossover hose 260 has a fluid flow restrictor 267. Crossover hose 260 can be utilized in a fuel delivery system as described in FIG. 9 opposite a crossover hose 160. The fluid restrictor 267 and the crossover hose 260 provide a fluid flow restrictor which makes the crossover hose 260 non-symmetric with respect to the crossover hose 160. As previously explained, the non-symmetric properties will inhibit resonating vibrations from being generated.

In a similar manner, crossover hose 230 can be utilized in the fuel delivery system 113 with a crossover hose 130. If the body of a crossover hose 230 is identical with that of crossover hose 130, the non-symmetric feature can be provided with a fluid flow restrictor 237 provided in the crossover hose 230. The utilization of multiple crossover hoses in fuel delivery system 113 provides even more even cross flow and also gives a more equal temperature distribution since there are no dead end legs for the fuel delivery system.

Figure 12:
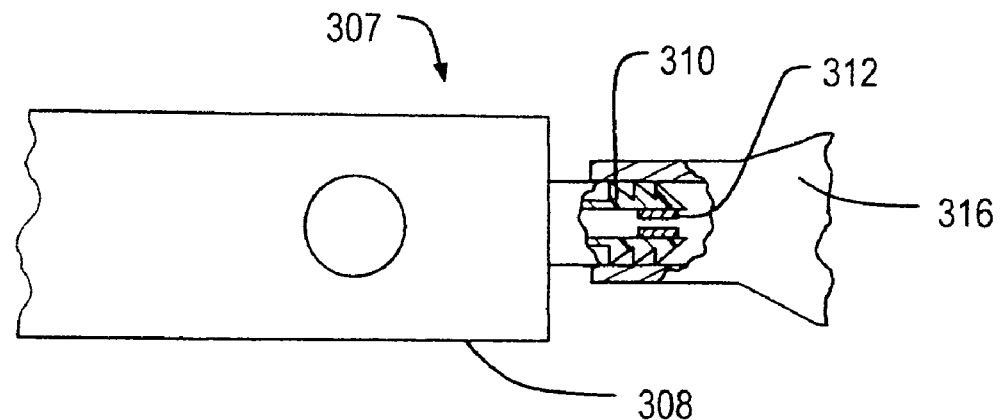
FIG. 12 is a top partial schematic view of a fuel rail system which utilizes a crossover hose wherein the hose end fittings incorporate a fluid flow restrictor.

Referring to FIG. 12, a partial view of a fuel rail assembly 307, which has two fuel rails (only one shown) includes a fuel rail 308 having a barbed male fitting 310. The fitting 310 has a fluid flow restrictor 312 mounted therein. The restrictor 312 reduces pulsations and evens the flow between the two fuel rails of the fuel rail assembly. In the fuel rail assembly 307, either a single or multiple fuel hoses 316 can be utilized.

Figure 13:
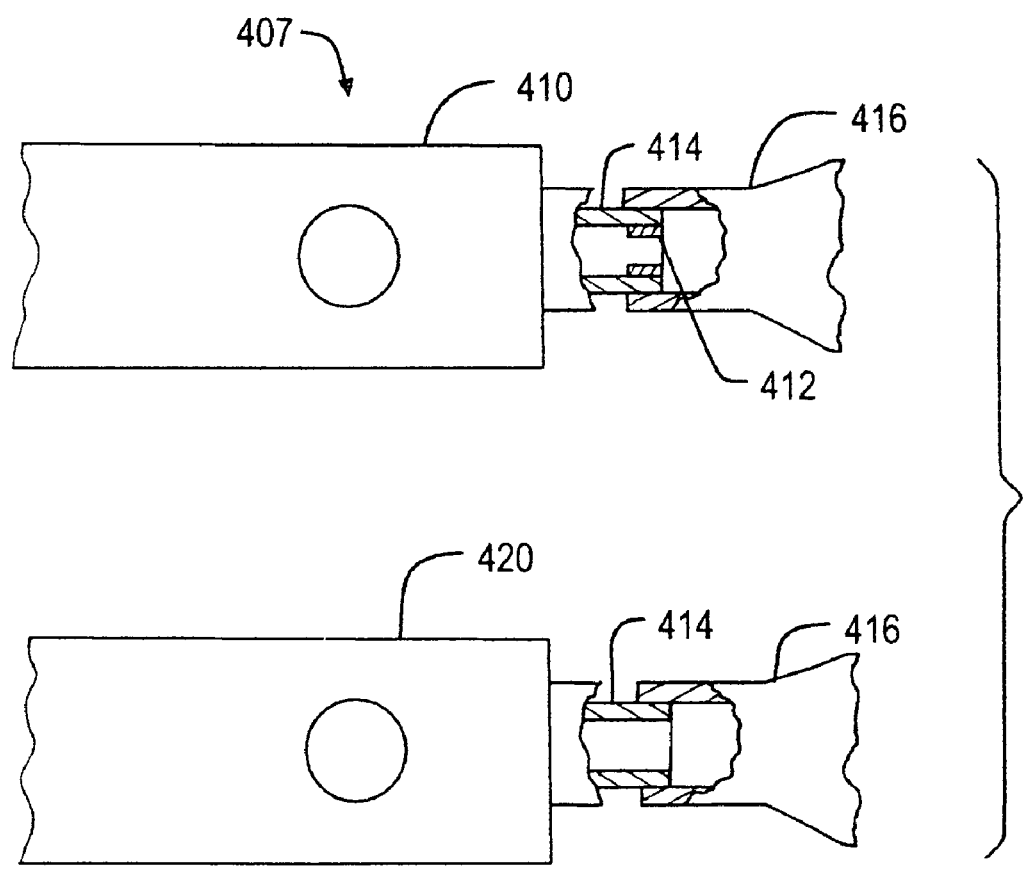
FIG. 13 is a schematic view of a fuel rail system which utilizes at least one metallic crossover tube wherein the end fittings incorporate a fluid flow restrictor mounted therein.

Referring to FIG. 13, 1 fuel rail assembly 407 has fuel rails 410 and 420 which are substantially similar to that of the fuel rails aforedescribed. Each of the fuel rails 410 and 420 has a fluid end connection 414 which is joined to a metallic conduit provided by a tube 416. The tube 416 would typically be brazingly connected with the end fitting 414. A fluid flow restrictor 412 is provided within the fitting 414 which is connected with the fuel rail 410. A single fluid restrictor 412 may be utilized or fluid restrictors of differing resistance or the same may be utilized in both fittings 414 and the fuel rails 410 and 420.

It will be apparent to those skilled in the art that the fuel rail assemblies 307 and 407 may have dual crossover conduits or single ones.

The present invention has been shown in several embodiments. However, it will be apparent to those skilled in art of the various changes and modifications which can be made to the present invention without departing from the spirit or scope of the invention as it has been explained and as embodied in the accompanying claims.

The invention claimed is:

1. A crossover hose for communicating fuel between two fuel rails of a fuel-injected, spark-ignited internal combustion engine comprising:
   a polymeric tubular member having opposite end connections for joining with said fuel rails;
   a main body connected with said end connections having a flattened portion configured to elastically deform under certain pressure conditions, said flattened portion having a cross-section in the shape of an ellipse for damping pressure pulsations within said hose, wherein said ellipse has a major diameter and a minor diameter and said major diameter is greater in length than said minor diameter.

2. A crossover hose as described in claim 1 wherein said hose is fabricated from a molded plastic material.

3. A crossover hose as described in claim 1 wherein said hose is fabricated from Nylon™.

4. A crossover hose as described in claim 1 wherein said flattened portion has an enlarged width with respect to said end connection.

5. A crossover hose as described in claim 1 wherein at least one of said end connections is continuous with an enlarged nonflattened leg juxtaposed between said end connection and said flattened portion.

6. A crossover hose as described in claim 1 wherein said flattened portion has a width significantly larger than said end connection.

7. A crossover hose as described in claim 1 having a generally U-shape channel with extending legs connected to said end connections and wherein said flattened portion is between said legs.

8. A crossover hose as described in claim 1 further including a fluid flow restrictor.

9. A crossover hose for communicating fuel between two fuel rails of a fuel-injected, spark-ignited internal combustion engine comprising:
   a plastic tubular member having opposite end connections for joining with said fuel rails; and
   a main body connected with said end connections and forming a U-shape channel therewith, said main body having a flattened portion configured to elastically deform under certain pressure conditions, said flattened portion having a cross-section in the shape of an ellipse wherein said ellipse has a major diameter and a minor diameter and said major diameter is generally larger than the width of said end connections for damping pressure pulsations with said hose, said major diameter also being greater in length than said minor diameter.

10. A fuel rail assembly for a fuel-injected spark-ignited internal combustion engine comprising:
    first and second fuel rails, each said fuel rail formed by a tube having a plurality of injector outlets, at least one fuel rail having an inlet for receiving pressurized fuel, and each said fuel rail having orifices to allow for fluid communication between said fuel rails;
    a first crossover hose for communicating fuel between said fuel rails, said crossover hose including:
    a polymeric tubular member having opposite end connections for connection with said fuel rail orifices; and
    a main body connected with said end connections having a flattened portion configured to elastically deform under certain pressure conditions, said flattened portion having a cross-section in the shape of an ellipse for damping pressure pulsations within said hose, wherein said ellipse has a major diameter and a minor diameter and said major diameter has a greater length than said minor diameter.

11. A fuel rail assembly as described in claim 10 wherein said fuel rails are parallel spaced from one another.

12. A fuel rail assembly as described in claim 10 wherein each of said first and second fuel rails has at least two separate orifices to allow for fluid communication of fuel between said fuel rails and wherein there is a second crossover hose for communicating fuel between the fuel rails, said second crossover hose being a polymeric tubular member having opposite end connections with said fuel rail orifices.

13. A fuel rail assembly as described in claim 12 wherein said first and second crossover hoses are non-symmetric with one another.

14. A fuel assembly as described in claim 13 wherein said one of said hoses has a fluid flow restrictor.

15. A fuel assembly as described in claim 12 wherein said second crossover hose has a main body with a flattened portion for damping pressure pulsations.

16. A fuel rail assembly as described in claim 10 wherein each of said first and second fuel rails has at least two separate orifices to allow for fluid communication of fuel between said fuel rails and wherein there is a second crossover hose for communicating fuel between said fuel rails, said second crossover hose being a polymeric tubular member having opposite end connections with said fuel rail orifices and wherein one of said fuel rail has an end fitting connection with one of said hoses, and said fitting connection has a fluid flow restrictor therein.

* * * * *